Figure 1:
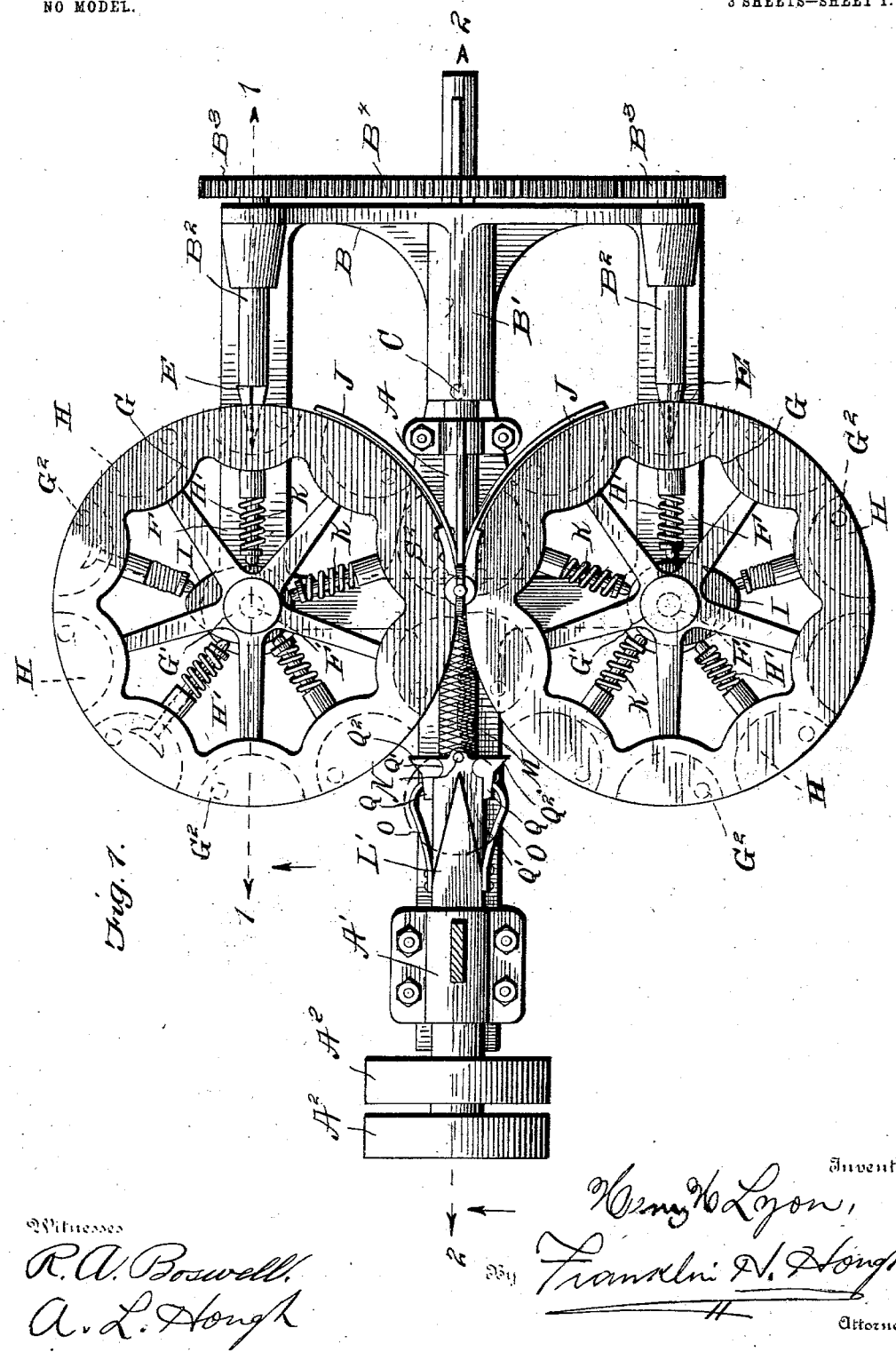

No. 746,720. PATENTED DEC. 15, 1903.
H. H. LYON.
APPARATUS FOR REMOVING PULP FROM FRUIT.
APPLICATION FILED MAY 29, 1903.
NO MODEL. 3 SHEETS—SHEET 1.

Witnesses
R. A. Boswell
A. L. Hough

Inventor
Henry H. Lyon,
By Franklin H. Hough
Attorney

No. 746,720. PATENTED DEC. 15, 1903.
H. H. LYON.
APPARATUS FOR REMOVING PULP FROM FRUIT.
APPLICATION FILED MAY 29, 1903.
NO MODEL. 3 SHEETS—SHEET 2.
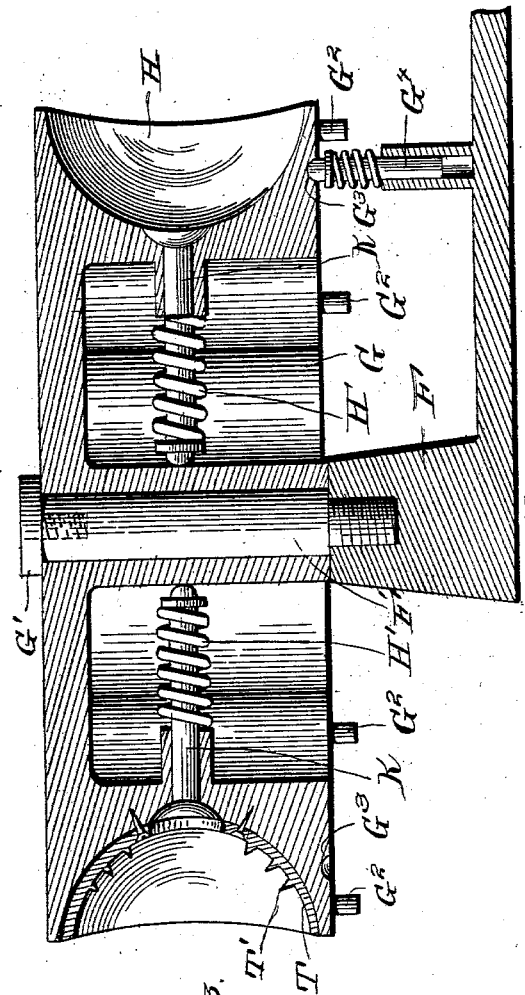
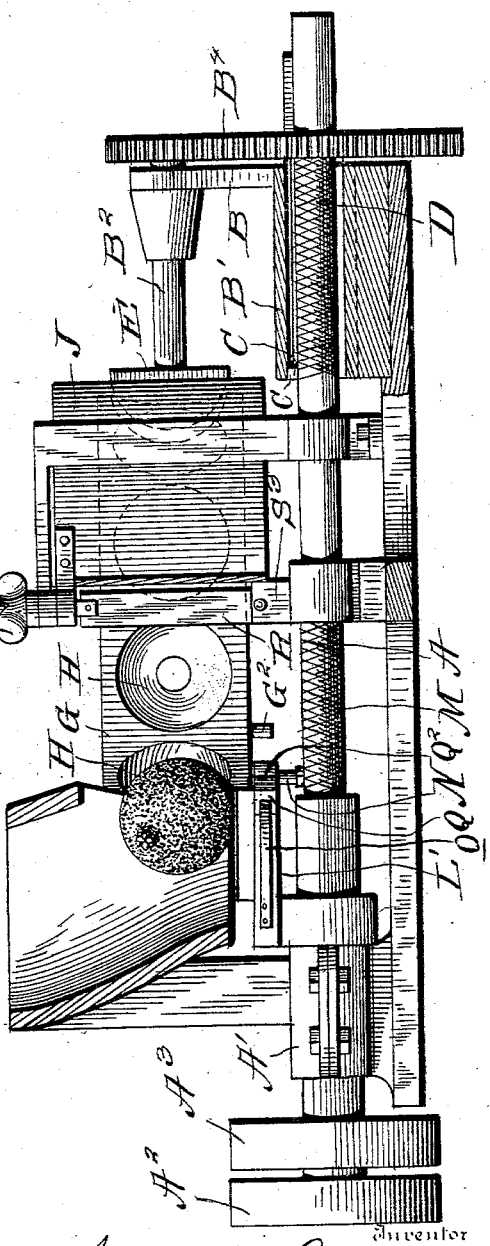

No. 746,720. PATENTED DEC. 15, 1903.
H. H. LYON.
APPARATUS FOR REMOVING PULP FROM FRUIT.
APPLICATION FILED MAY 29, 1903.
NO MODEL. 3 SHEETS—SHEET 3.
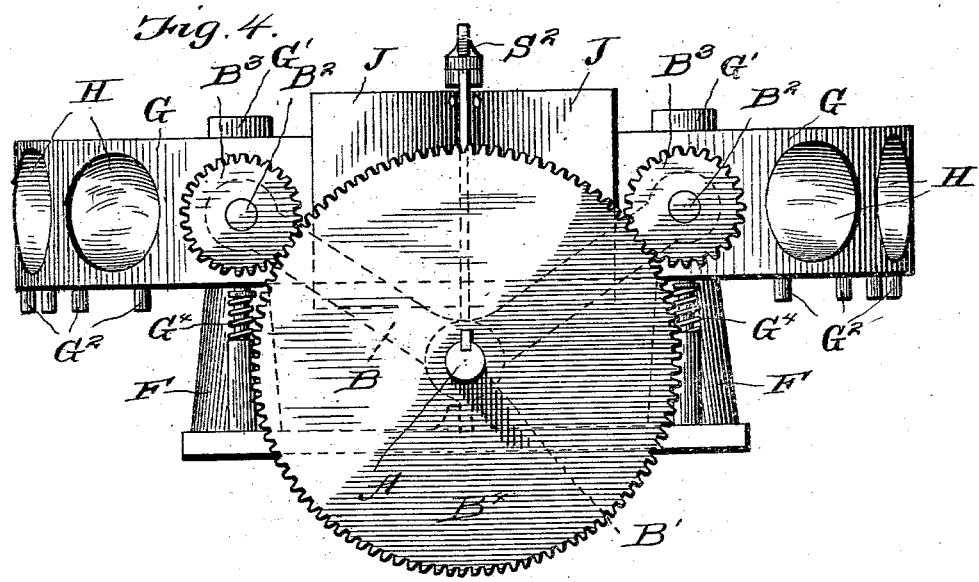
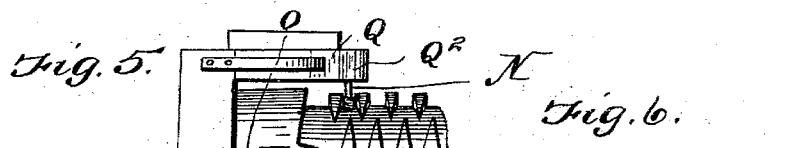
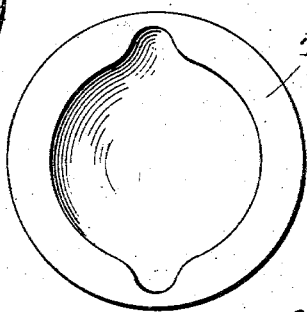
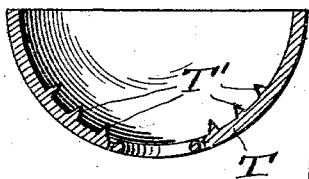
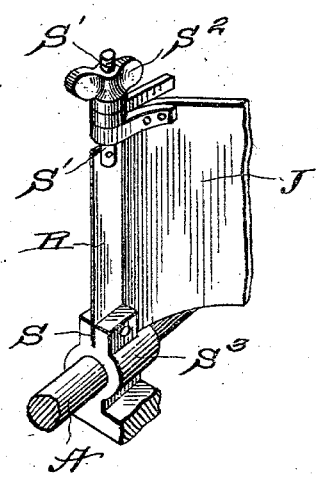
WITNESSES
R. A. Boswell
A. L. Hough
INVENTOR
Henry H. Lyon,
By Franklin H. Hough
Attorney No. 746,720. Patented December 15, 1903.

UNITED STATES PATENT OFFICE.

HENRY H. LYON, OF RIVERSIDE, CALIFORNIA.

APPARATUS FOR REMOVING PULP FROM FRUIT.

SPECIFICATION forming part of Letters Patent No. 746,720, dated December 15, 1903.

Application filed May 29, 1903. Serial No. 159,377. (No model.)

*To all whom it may concern:*

Be it known that I, HENRY H. LYON, a citizen of the United States, residing at Riverside, in the county of Riverside and State of California, have invented certain new and useful Improvements in Apparatus for Removing Pulp from Fruit; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in apparatus for extracting the pulp from fruit—such as oranges, lemons, grape-fruit, &c.—without impairing the shape of the halves of the fruit, thus rendering it possible to utilize the rinds for candied peel for commercial use.

The invention consists more specifically in the provision of rotary carriers having recesses about their circumferences which are adapted to receive a one-half section of an orange or other fruit and feed the same against a knife for cutting the fruit into halves and in the provision of reciprocating cutting-knives, which are adapted to cut out the pulp of each half-section of the fruit and after the pulp has been removed the one-half section of the peel or rind of the fruit being expelled from the carrier by automatic means as the carrier rotates.

My invention consists, further, in various details of construction and combinations of parts, which will be hereinafter fully described and then specifically defined in the appended claims, and is illustrated in the accompanying drawings, in which—

Figure 1 is a top plan view of my improved apparatus. Fig. 2 is a longitudinal sectional view through the apparatus. Fig. 3 is a sectional view through one of the carriers, parts being shown in elevation. Fig. 4 is an end view of a portion of the apparatus. Fig. 5 is a detail view of the rotary pulp-extracting knife. Fig. 6 is a detail view of the knife employed in cutting the fruit in half, and Figs. 7 and 8 are detail views. Fig. 9 is a detail view showing the manner of driving the platform on which the fruit is conveyed.

Reference now being had to the details of the drawings by letter, A designates an operating-shaft, which is mounted in suitable bearings A' and has a driving-pulley $A^2$ fixed to rotate therewith and an idler $A^3$, loosely journaled upon the shaft.

B designates a movable carrier mounted upon the shaft and has a hollow shank portion B', which carries a pin C, designed to engage the right and left threads D, which are in the circumference of said shaft. Said carrier B' has mounted therein the shafts $B^2$, which carry at their forward ends the semispherical-shaped cutters E, which are adapted to cut the pulp from each half-section of an orange or other fruit from which the pulp is being removed. On the end of each shaft $B^2$ is keyed a gear-wheel $B^3$, each of which is in mesh with a gear-wheel $B^4$, splined to the shaft A.

Mounted upon bracket-arms F, a detail view of one of said brackets being shown in Fig. 3 of the drawings, is a pin F', on which is journaled one of the rotary carrier-wheels G. Said wheels G, there being two shown in the drawings, are held upon their pivotal pins by means of a headed bolt G', and the circumference of each of the rotary carriers has a series of semispherical recesses H, and a piston K is mounted to have a reciprocating movement through an aperture in the bottom of each semispherical recess and is retained in its normal position by means of a spring H', which bears between the head at the inner end of the pin K and a fixed portion of the rotary carrier.

I designates a stationary cam which is mounted in the path of the inner ends of said pistons H, and as the rotary carriers travel about the shaft F' said pistons in succession are driven by said cam in the position shown in Fig. 1 of the drawings, whereby the peel of the orange or other fruit from which the pulp is being cut is expelled from the recess in which it is held by the carrier. Each of said rotary carriers has a series of pins $G^2$, one between each of the recesses, and is also provided with a depression $G^2$, which is engaged by a spring-actuated pin $G^3$, mounted upon the frame of the machine. Said depressions $G^2$ are provided for the purpose of receiving the spring-actuated pin to hold the rotary carriers from moving backward. The two rotary carriers, which are identical in construction, are mounted so that their circumferences come nearly in contact with each other, and a shield J of double-concaved form is provided to hold the two half-sections of the fruit in the recesses after being severed by the knife and until the carrier rotates to a position when the pistons are actuated by the cam to expel the peel after the pulp has been removed.

Mounted at any suitable location adjacent to the carrier-wheels is a platform L, carrying a pin N, which is in engagement with the right and left threads M, formed in the circumference of the shaft A. A hopper T, supported on an arm T', is so positioned that its lower end will deliver the fruit on the reciprocating platform directly underneath in readiness to be fed between the carrier-wheels. Fixed to said platform on either side are the spring-arms O, the free ends of which carry cams Q, which have shouldered portions Q', which engage recesses in the opposite edges of said platform, while the outer portions of the cams have projections $Q^2$, which are designed as the platform is driven forward by the travel of the pin in said threads M to contact with the pins $G^2$ for imparting an intermittent movement to the rotary carrier-wheels. A knife R is mounted in suitable guideways S adjacent to the apex of the concaved shield and is held by means of the threaded bolts S', upon which a tightening-nut $S^2$ is mounted. The lower end of the knife is held to a bracket-arm $S^3$, and by means of a winged nut $S^2$ the knife may be held taut and against which oranges or other fruit which is to be cut in halves are to be fed by the rotary carriers.

The operation of my device is as follows: The fruit being fed upon the platform, when the parts of the machine are in the positions illustrated in Fig. 1 of the drawings, the shaft rotated continuously in one direction will cause the orange to be fed forward upon the platform by the travel of the pin N' in the right-hand thread of the right and left threaded portion M, and as the projecting portions $Q^2$ of the cams come in contact with the pins $G^2$ an intermittent movement is imparted to the rotary carriers, and the fruit which is fed between the semispherical recesses in the rotary carriers is pushed against the knife, thus severing the fruit into two semispherical sections, and by the time an orange or other fruit has been thus cut the pin N will have reached the end of the right-threaded portion and will switch into the left-threaded portion of the shaft and begin its return movement. As the fruit is cut in halves the latter are retained in the recesses in the carrier by means of the shield J, and when one of the recesses containing a half-section of the fruit comes in contact with the rotary knife E said rotary knife will be fed forward by the pin C, traveling in the left-grooved portion D and be rotated rapidly by means of its gear connection with the splined wheel $B^4$, and the pulp will be extracted from the half-section. This movement of cutting out the pulp, it will be understood, is accomplished while the rotary carrier is at rest, and the moment that a following orange or other fruit is ready to be fed forward to be cut in half the pin C will have begun to return in the left threads of the shaft D, which will cause the rotary cutting-knife to be thrown away from the rotary carrier out of the path of the latter as another intermittent movement is imparted to the carrier. As the platform returns to its normal position the cams will pass by the pins on the rotary carriers and return to their normal positions by means of the spring O. After the pulp has been cut out from the half-section of orange or other fruit the peel or rind is in readiness to be expelled from the carrier, and this is accomplished by means of a piston being driven against the rind by the inner end of each piston traveling over the stationary cam I in the manner illustrated in Fig. 1 of the drawings.

In order to prevent the fruit of whatever kind is being operated upon to remove the pulp therefrom from rotating in the carrier, receptacles or cups T may be employed, which are adapted to be fastened in any suitable manner within recesses about the circumference of the carrier. These receptacles are preferably provided with spurs T' in order to engage fruit of spherical shape or with a smooth surface to prevent the same from rotation. These cups or receptacles may be of different sizes in order to adapt the machine for use with various sizes of fruit.

From the foregoing it will be observed that the operation of my carrier is entirely automatic; that the oranges or other fruit are fed into the hopper and successively halved and the pulp removed by rotary knives and the rind thrown away from the carrier and in suitable condition for candying or other purposes.

While I have shown a particular construction of apparatus illustrating my invention, it will be understood that I may make alterations in the various details of construction of the same without departing from the spirit of the invention.

Having thus fully described my invention, what I claim as new, and desire to secure by Letters Patent, is—

1. An apparatus for removing the pulp from oranges, &c., consisting of two rotary carriers having semispherical recesses about their circumferences, a reciprocating platform upon which the fruit is fed between the rotary carriers, and means for imparting an intermittent movement to the carriers as the fruit is fed between the same, a knife for cutting the fruit in halves, and rotary cutting-knives for removing the pulp from the half-sections, as set forth.

2. An apparatus for removing the pulp from fruit, comprising two rotary carriers having semispherical recesses about their circumferences, a reciprocating platform upon which fruit is fed between the carriers, means for imparting an intermittent movement to the carriers as the carriage advances, a knife for cutting the fruit in half, a rotary cutter for removing the pulp from the half-sections of fruit, and means for expelling the rind after the pulp has been cut therefrom, as set forth.

3. An apparatus for removing the pulp from fruit, comprising two rotary carriers having series of semispherical recesses about their circumferences, a reciprocating platform upon which fruit rests, means for moving the latter between the carriers, a stationary knife for cutting the fruit in halves, means for imparting an intermittent movement to the rotary carriers, a double-concaved shield for holding the half-sections of the fruit in the carriers, rotary cutting-knives for removing the pulp from the half-sections, and means for expelling the rind after the pulp has been cut therefrom, as set forth.

4. An apparatus for cutting the pulp from oranges and other fruit, comprising two rotary carriers having semispherical recesses about their circumferences, a stationary knife intermediate the carriers, a platform from which fruit is fed between the carriers, means for imparting an intermittent movement to the carriers as the platform is fed forward, a shield for holding the half-sections of fruit in said recesses, a rotary knife adapted to cut the pulp from the half-sections, a stationary cam, and pistons actuated thereby for expelling the rinds after the pulp has been cut therefrom, as set forth.

5. An apparatus for cutting the pulp from oranges and other fruit, comprising two rotary carriers having series of semispherical recesses about their circumferences, pins mounted upon said carriers, a platform upon which the fruit is deposited, and means for reciprocating said platform to feed the fruit between the carriers, means engaging said pins carried by the platform for imparting an intermittent movement to the rotary carriers, a shield for holding the half-sections of the fruit in the rotary carriers, and rotary knives for cutting the pulp, and means for expelling the rind after the pulp is cut therefrom, as set forth.

6. An apparatus for cutting the pulp from fruit, comprising two rotary carriers having a series of semispherical recesses about their circumferences and a spring-pressed piston in each of said recesses, a stationary cam adapted to actuate said pistons, a platform upon which the fruit is deposited, means for reciprocating said platform to feed the fruit between the carriers, and impart an intermittent movement to the carriers, stationary knives against which the fruit is pushed, shields for retaining the half-sections of fruit in the recesses of the carriers, and rotary knives for cutting the pulp from the half-sections of fruit as set forth.

7. An apparatus for cutting the pulp from fruit, comprising the rotary carriers having semispherical recesses about their circumferences, a platform upon which the fruit is fed between the carriers, means for reciprocating said platform, a stationary knife against which the fruit is pushed, shields for holding the half-sections of fruit in the carriers, reciprocating shafts, and rotary cutters mounted on said shafts for cutting the pulp from the half-sections, and means for expelling the rinds after the pulp has been cut therefrom, as set forth.

8. An apparatus for cutting the pulp from fruit, comprising two rotary carriers having semispherical recesses about their circumferences, spring-actuated pistons carried by said carriers, and a stationary cam for actuating said pistons, a platform on which the fruit is deposited, lugs projecting from said carriers, spring-actuated cams carried by the platform and adapted to contact with said lugs to impart an intermittent movement to the carriers, a stationary knife against which the fruit is forced and cut into half-sections, shields for holding the half-sections in the recesses, reciprocating rotatable cutters for removing the pulp, as set forth.

9. An apparatus for cutting the pulp from fruit, comprising two rotary carriers having semispherical recesses about their circumferences, lugs intermediate the recesses on the carriers, a rotatable shaft having right and left threads, a platform having a pin designed to engage said right and left threads, spring-actuated cams carried by the platform and adapted to contact with said lugs to impart an intermittent movement to the carriers, a stationary knife against which the fruit is forced, shields to hold the fruit in the carriers, a reciprocating bracket member, pins carried thereby and adapted to travel in the right and left threaded portion of the shaft, a gear-wheel splined to the shaft, stub-shafts carried by said bracket-arms, rotary cutting-knives mounted upon said stub-shafts, and gear connections between the same and said splined wheel, as set forth.

10. An apparatus for cutting the pulp from fruit, comprising rotary carriers having semispherical recesses about their circumferences, spring-actuated pistons mounted upon the carriers, cams for actuating said pistons, a rotatable shaft with right and left threads therein, a platform having a pin engaging said threads, spring-actuated cams carried by said platform, lugs upon the carrier against which said cams are adapted to contact and impart an intermittent movement to the carriers, spring-pressed members engaging recesses in said carriers, a stationary knife, and reciprocating and rotatable knives for cutting the pulp from the half-sections of fruit, as set forth.

11. An apparatus for cutting pulp from fruit, comprising rotary carriers having recesses about their circumferences, fruit-holding receptacles fitted to said recesses, spring-actuated pistons mounted upon the carriers, cams for actuating said pistons, a rotatable shaft with right and left threads therein, a platform having a pin engaging said threads, spring-actuated cams carried by said platform, lugs upon the carrier against which said cams are adapted to contact and impart an intermittent movement to the carriers, spring-pressed members seated in recesses in said carriers, a stationary knife, and reciprocating and rotatable knives for cutting the pulp from the sections of fruit, as set forth.

In testimony whereof I hereunto affix my signature in presence of two witnesses.

HENRY H. LYON.

Witnesses:
GEORGE O. FRENCH,
CHRISTIE S. BARTEE.